3,330,830
PROCESS IMPROVEMENT IN AMINO-TRIAZINE
PRODUCTION AND OXYALKYLATION
Donald W. Kaiser, Hamden, Conn., assignor to Olin Mathieson Chemical Corporation, a corporation of Virginia
No Drawing. Filed Sept. 10, 1964, Ser. No. 395,611
13 Claims. (Cl. 260—249.6)

This invention relates to an improved process for preparing triazines, an improved process for preparing oxyalkylated triazines, a process for preparing polyurethanes from oxyalkylated triazines, and to the compositions produced by these processes.

This application is a continuation-in-part of co-pending applications Ser. No. 220,072, filed Aug. 28, 1962, and Ser. No. 275,493, filed Apr. 25, 1963, both of which are now abandoned.

A variety of processes have been described in the art for the preparation of triazines such as guanamines. In U.S. Patent 2,344,784 there is described a method for manufacturing guanamines in which a biguanide is reacted with an ester of organic carboxylic acid in the presence of a caustic alkali such as sodium hydroxide. Preferably, this reaction is carried out in a suitable solvent which can be a lower monohydric alcohol. An improved process for preparing guanamines is set forth in U.S. Patent 2,309,679 in which biguanide is reacted with an ester of an organic carboxylic acid in the presence of a metal alkoxide such as aluminum isopropoxide. As the art is aware, guanamines can be prepared by heating together dicyandiamide and a nitrile in the presence of a basic catalyst. This process has been found to give inferior yields with fatty acid nitriles having more than eight carbon atoms. In U.S. Patent 2,606,904 an improved process for preparing guanamines by the reaction of dicyandiamide with a higher fatty acid nitrile dissolved in a hydroxylated solvent is disclosed. In this process the dicyandiamide is added portionwise to the higher fatty acid nitrile and substantially increased yields of the guanamine are claimed.

Oxyalkylation of triazines such as melamine and guanamines have been attempted previously in the absence of solvents as disclosed in U.S. Patent 2,381,121 issued Aug. 7, 1945 to Walter P. Ericks. The degree of oxyalkylation obtained by this technique is relatively low.

Attempts to employ oxyalkylated triazines as the polyol reactant in the preparation of polyurethane foams has not been disclosed in the literature because heretofore relatively pure oxyalkylated triazines were not available in large quantity.

It is an object of this invention to provide an improved process for preparing triazines.

Another object of the invention is to provide an improved process for preparing oxyalkylated triazines.

It is another object of this invention to provide an improved process for preparing polyurethane foams.

A further object of this invention is to provide an improved process in which oxyalkylated triazines are employed as a reactant in the preparation of polyurethane foams.

Still a further object is to provide novel polyurethane foams.

These and other objects of this invention will be apparent from the following description thereof.

It has now been discovered that the above mentioned objects are accomplished by reacting cyanoguanidine with a suitable organo nitrile in the presence of a lower dialkyl-substituted sulfoxide and a basic catalyst to yield a 2-organo-4,6-diamino-triazine. The resulting triazine is reacted with an alkylene oxide in the presence of a lower dialkyl-substituted sulfoxide and a basic catalyst to yield the corresponding oxyalkylated triazine. The oxyalkylated triazine reaction product is recovered by distilling or by otherwise removing the lower dialkyl-substituted sulfoxide solvent and by-products formed during the reaction, and the purified oxyalkylated triazine is reacted with an organic diisocyanate in the presence of a catalyst and a foaming agent to yield a polyurethane foam.

More in detail, the reaction of cyanoguanidine with the organic nitrile is represented by the following equation:

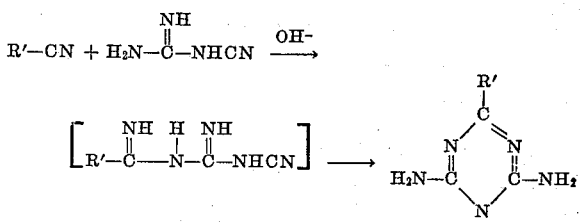

wherein R′ is selected from the group consisting of alkyl having from 1 to about 23 carbon atoms, aryl having between about 6 and about 10 carbon atoms, alkylene having between about 6 and about 20 carbon atoms and heterocyclic having between about 4 and about 8 carbon atoms. Typical examples of suitable alkyl substituted nitriles are, for example, acetonitrile, trichloroacetonitrile, propionitrile, n-butyro and isobutyronitriles, isovaleronitrile, oenanthylonitrile, pelargononitrile, capronitrile, undecylonitrile, lauronitrile, myristonitrile, palmitonitrile, stearonitrile, behenontrile, 2-ethylhexanonitrile, 2-methylhexanonitrile, 3-isopropylhexanonitrile and the like. Typical examples of suitable alkenyl-substituted nitriles are for example, undecylenonitrile, oleonitrile, eruconitrile and the like. Aryl-substituted nitriles which may be employed as a reactant in the preparation of the triazines are for example, benzonitrile, phenylacetonitrile, p-tolonitrile and the like. Heterocyclic substituted nitriles which may be employed as a reactant include, for example, 2-cyanopyridine, 2-cyanofuran and the like. Mixtures of the various nitriles can be employed if desired, and in addition, all of the foregoing mentioned radicals can be substituted with non-interfering substituents or with reactive substituents which do not hinder the triazine reaction, the subsequent oxyalkylation reaction or the subsequent polyurethane reaction.

The lower dialkyl sulfoxide employed as a solvent is represented by the formula:

wherein $R^2$ and $R^3$ are alkyl radicals of 1 to 3 carbon atoms inclusive. Sulfoxide solvents useful in the process of this invention include dimethyl sulfoxide, methyl ethyl sulfoxide, diethyl sulfoxide, di-n-propyl sulfoxide, di-isopropyl sulfoxide mixtures thereof and the like. If desired, the solvent system may be formed from a mixture of the lower dialkyl sulfoxide and another solvent such as toluene, xylene, dioxane and the like. The proportion of the lower alkyl sulfoxide in the solvent mixture may be in the range from about 5 to 100 percent by weight of the solvent system.

The minimum proportion of dialkyl sulfoxide used is suitably sufficient to dissolve at least a portion of the cyanoguanidine. As the oxyalkylation proceeds, the remaining cyanoguanidine dissolves in the reaction mixture. Preferably the weight ratio of cyanoguanidine to dialkyl sulfoxide in the solvent is from 1:1 to 1:5. Larger proportions of dialkyl sulfoxide are not deleterious but only increase the amounts subsequently to be removed.

The reaction is conducted in the presence of a basic catalyst such as sodium hydroxide, potassium hydroxide, sodium methoxide and the like. Any catalytic portion of the catalyst which accelerates the rate of reaction may be employed. Generally a proportion in the range between about 0.1 and about 0.3 mole of basic catalyst per mole of the organo nitrile is employed but greater or lesser amounts may be employed if desired.

The temperature and time of reaction will depend largely on the particular reactants employed, the catalyst employed and the proportions thereof. Thus, for example, the reaction between benzonitrile and cyanoguanidine is extremely exothermic and the reaction is difficult to control unless the benzonitrile is added stepwise to the cyanoguanidine.

Several advantages are obtained by employing a lower alkyl sulfoxide such as dimethyl sulfoxide as the solvent. For example, lower reaction temperatures may be employed while still obtaining a reasonably short reaction time. In addition no pressure is required during the reaction as is required when liquid ammonia is used. Further, since the cyanoguanidine and nitriles are very soluble in the alkyl sulfoxide solvent, higher concentrations of reactants may be employed in the reaction, thereby markedly increasing the product yield above that obtained with conventional solvents. Recovery of the product from the reaction mixture is also easier than in prior art processes, since the quantity of solvent to be removed is less. Another important advantage of the process is that a wide range of alkyl and alkenyl guanamines can be produced. Furthermore the resulting triazine may be further reacted with an alkylene oxide to effect oxyalkylation thereof in the same reaction mixture and in the same reaction vessel if desired.

In accordance with the process of the present invention any amino-1,3,5-triazine compound containing at least two amino groups may be oxyalkylated, whether prepared by the process described herein or otherwise. Exemplificative of such compounds are the 2,4,6-triamino-1,3,5-triazines, including melamine and substituted melamines, the 4,6-diamino-1,3,5-triazines, such as guanamines and formoguanamine, the 2-substituted-4,6-diamino-1,3,5-triazines and the substituted guanamines in general. Generally the hydrocarbon substituted triazines which may be employed have the following structural formula:

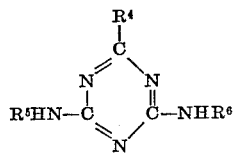

wherein $R^4$ is selected from the group consisting of hydrogen, alkyl having from 1 to about 23 carbon atoms, aryl having between about 6 and about 10 carbon atoms, alkylene having between about 6 and about 20 carbon atoms, and heterocyclic having between about 4 and about 8 carbon atoms; and $-NR^7R^8$.

$R^5$ and $R^6$ are each independently selected from the group consisting of hydrogen, lower alkyl and aryl;

$R^7$ is selected from the group consisting of hydrogen, lower alkyl, aryl and lower alkene; and $R^8$ is selected from the group consisting of hydrogen, lower alkyl and lower alkene.

The variable R's are as defined above with specific substituents varying within the entire range listed above. The lower alkyl radical in every case may be any alkyl radical containing from 1 to 6 carbon atoms, inclusive, such as methyl, ethyl, propyl, butyl, amyl, hexyl and isomers thereof. The lower alkene radical in every case may be any alkene radical containing from 4 to 6 carbon atoms, inclusive, such as butenyl, pentenyl, etc., and isomers thereof. Examples of aryl radicals include naphthyl, anthracyl, and preferably phenyl or chlorophenyl. In addition, all of the foregoing radicals may be substituted with non-interfering substituents or with reactive substituents which do not hinder the oxyalkylation reaction.

Throughout the present specification the term alkylene oxide is intended to include any alkylene oxide or alkylene oxide containing non-interfering substituents, such as hydroxyalkylene oxides, for example, glycidol, and aralkylene oxides, for example, styrene oxide. The unsubstituted alkylene oxides, especially the lower alkylene oxides are preferred, for example, ethylene oxide, propylene oxide, butylene oxide, isobutylene oxide, n-hexyl oxide, etc. The cycloalkylene oxides may also be used, for example, cyclohexylene oxide.

The foregoing reaction is accelerated by employing an elevated temperature, i.e., from 75 to 175° C. and preferably from 90° to 140° C. and the use of a basic catalyst, such as the conventional organic or inorganic base activators. The catalyst is preferably an alkali metal hydroxide or alkoxide, such as sodium hydroxide, potassium hydroxide, sodium methoxide and the like. The reaction is initially exothermic and conventional cooling means are normally employed to maintain the reaction at the desired temperature. The reaction time is not critical and will vary depending upon the degree of completion desired, temperature and reactants.

The ratio of said triazine to alkylene oxide may vary from 1:2 to 1:125. Thus it can be readily seen that oxyalkylated products may be tailor-made for particular properties depending upon the moles of alkylene oxide employed, i.e., in the reaction between said triazine and the alkylene oxide from 2 to 125 moles of alkylene oxide may be used per mole of triazine. The properties of the resultant compound will naturally vary depending upon the characteristics of the substituents and the number of moles of alkylene oxide employed.

The reaction is conducted in a solvent containing dialkyl sulfoxide in an amount of from 5 to 100 percent by weight of the solvent portion. It is a surprising feature of the present invention that when at least a portion of the solvent component is dialkyl sulfoxide, generally from 5 to 100 percent, the triazines may be readily oxyalkylated. The total solvent component may consist of the dialkyl sulfoxide, or for economy, varying amounts of less expensive and convenient solvents may be employed, such as toluene, xylene, dioxane, etc.

The products prepared in accordance with the process of the present invention which are especially desirable are the di- and triamino-1,3,5-triazines oxyalkylated with an unsubstituted alkylene oxide, especially an unsubstituted lower alkylene oxide, such as ethylene oxide, propylene oxide, butylene oxide, etc., due to the wide and inexpensive economic availability of these alkylene oxides and the excellent physical characteristics of the resultant oxyalkylated products.

The oxyalkylated products may be recovered from the reaction mixture by conventional methods, for example, addition of acid to the mixture to neutralize the basic catalyst, distillation of excess solvent and recovery of the product by filtration. The acid used for neutralization of the catalyst is not critical, for example, phosphoric, monoammonium phosphate, sulfonic, hydrochloric, trichloroacetic, sulfuric, etc. Alternatively, the triazine may be partially oxyalkylated, solvent removed by distillation, and oxyalkylation continued.

The oxyalkylated products of the present invention have numerous highly desirable characteristics. They may be utilized as the polyol component in the preparation of flexible, rigid and semi-rigid polyurethane foams by reaction with a diisocyanate in the presence of a foaming agent and catalyst. The resultant polyurethane foams are characterized by greatly improved flame retardance, humid aging properties and hydrolytic stability. In addition, the oxyalkylated products of the present invention may be used as anti-corrosion agents and dispersants for lubricating oils, plasticizers or stabilizers for poly(vinyl chloride) resins, epoxy resin curing agents, and reactants for the preparation of the polyester resins. The salts, such as the phosphates, are water soluble and may be utilized as cationic detergents and softening agents for cotton.

The oxyalkylated triazines prepared in accordance with the above described procedure can be reacted with an organic polyisocyanate in the presence of a catalyst and a foaming agent to yield rigid, semi-rigid or flexible foam.

More in detail, suitable organic polyisocyanates which may be employed in the preparation of the polyurethane foams include di-isocyanates, tri-isocyanates, and polyisocyanates. Especially preferred are mixed isomers of tolylene di-isocyanate which are readily available commercially. Other suitable isocyanates include methylene-bis-(4-phenyl isocyanate), 3,3'-bitolylene-4,4'-di-isocyanate, 3,3'-dimethoxy-4,4'-bi-phenylene di-isocyanate, naphthalene-1,4-di-isocyanate, hexamethylene di-isocyanate, polymethylene polyphenyl isocyanate (PAPI) and 1,4-phenylene di-isocyanate. The amount of isocyanate employed in the preparation of the polyurethane foams should be sufficient to provide at least 0.7 NCO groups based on the number of hydroxyl groups present in the oxyalkylated triazine of the present invention, the number of hydroxyl groups in any additive employed and the number of hydroxyl groups employed in the foaming agent. An excess of isocyanate compound may be conveniently employed; however, this is generally undesirable due to the high cost of the isocyanate compounds. It is preferable, therefore, to employ no greater than 1.5 NCO groups based on the number of hydroxyl groups and preferably between about 0.9 and 1.1 NCO groups.

Pre-polymers can be formed from the polyols of the present invention by reaction with a suitable excess of a di-isocyanate. The proportion of di-isocyanate in these prepolymers is suitable to provide from 1.4 to 3.0 NCO groups per hydroxyl group. The prepolymers are subsequently reacted with additional polyol with or without additional di-isocyanate in applications where the use of pre-polymers is advantageous.

The polyurethane foams are prepared in the presence of a foaming agent and a reaction catalyst. The foaming agent employed may be any of those known to be useful for this purpose, such as water, the halogenated hydrocarbons and mixtures thereof. Typical halogenated hydrocarbons include but are not limited to the following: monofluorotrichloromethane, difluorodichloromethane, 1,1,2-trichloro-1,2,2-trifluoroethane, methylene chloride, chloroform and carbon tetrachloride. The amount of foaming agent employed may be varied within a wide range. Generally however, the halogenated hydrocarbons are employed in an amount of from 1 to 50 parts by weight per 100 parts by weight of the adduct of the present invention, and generally the water, when employed, is in an amount of from 0.1 to 10 parts by weight per 100 parts by weight of the adduct of the present invention.

The polyurethane foams are prepared in the presence of a catalytic amount of a reaction catalyst. The catalyst employed may be any of the catalysts known to be useful for this purpose, including tertiary amines and metallic salts. Suitable tertiary amines include N-methyl morpholine, N-hydroxy morpholine, triethylene, diamine, triethylamine, trimethylamine and N,N-dimethylethanolamine. Typical metallic salts include, for example, the salts of antimony, tin and iron, for example, dibutyltin dilaurate and stannous octoate. The catalyst is usually employed in a proportion of from 0.1 to 2.0 percent by weight based on the coalkoxylation product of the present invention.

In the preparation of the polyurethane foams of the present invention minor amounts of emulsifier are preferably used to improve the cell structure of the polyurethane foam. Typical of such emulsifiers are the silicone oils and soaps. Generally up to 2 parts by weight of the surfactant is employed per 100 parts of polyol.

Various additives can be employed which serve to provide different properties, e.g., fillers, such as clay, calcium carbonate or calcium sulfate. These additives lower the cost and improve physical properties. Dyes may be added for color, and fibrous glass, asbestos, or synthetic fibers may be added for strength. In addition, plasticizers, deodorants and antioxidants may be added.

The following examples are presented to illustrate the invention more fully without any intention of limiting thereby. All parts and percentages are by weight unless otherwise indicated.

*Example I.—Oleoguanamine*

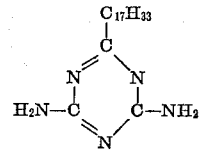

A stirred mixture of 252 g. (3.0 moles) of dicyandiamide (cyanoguanidine), 526 g. (2.0 moles) of commercial oleonitrile, 15 g. of 85 percent potassium hydroxide, and 500 ml. of dimethyl sulfoxide was heated to 100° C. under a reflux condenser. To the reaction mixture which consisted of two liquid layers there was added an additional 250 ml. of dimethyl sulfoxide and the temperature raised to 125° C. The reaction mixture was stirred vigorously for two hours while the temperature was held at 125° C. During this period some ammonia was evolved. The temperature was allowed to fall to 115° C. and an additional 84 g. (1.0 mole) of dicyandiamide and 15 g. of 85 percent potassium hydroxide was added. The temperature was then raised to 150° C. and at this stage ammonia evolution became vigorous and some solid (melamine) separated. After a total heating period of three hours, the melamine was filtered hot and washed with a small quantity of dimethyl sulfoxide. The filtrate was poured over ice which contained acetic acid to neutralize the catalyst. The precipitated, sticky solid was removed by filtration and air dried. The crude, oily product so-obtained was dissolved in a small volume of boiling acetone, the solution was treated with decolorizing charcoal, filtered and the filtrate cooled in a refrigerator. Filtration gave 79 g. of oleoguanamine (colorless crystals) which melted at 105–110° C.

*Example II.—Lauroguanamine*

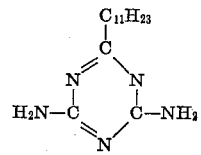

A stirred mixture of 126 g. (1.5 moles) of dicyandiamide, 10 g. of 85 percent potassium hydroxide, 362 g. (2.0 moles) of commercial lauronitrile, and 500 ml. of dimethyl sulfoxide was heated to 100° C. under a reflux condenser. Two layers were present. After 10 minutes, an additional 100 ml. of dimethyl sulfoxide was added and the temperature raised to 125° C., giving a homogeneous solution. A mild, exothermic reaction resulted and the temperature of the reaction mixture rose to 142° C. The heating mantle was removed and the temperature remained at 140–142° C. for over 10 minutes and then slowly fell. After an hour (total time from initial heating), the temperature was 125° C. In the next step an additional 126 g. (1.5 mole) of dicyandiamide and 10 g. of 85 percent potassium hydroxide was added and complete solution occurred. The temperature was then maintained at 125° C. for two hours and during this period some melamine separated from the solution and ammonia was also slowly evolved. The hot mixture was then concentrated under water pump vacuum at 125° C. for one and a half hours during which time an appreciable amount of the dimethyl sulfoxide was removed.

The hot, turbid solution was poured onto ice which contained 17.5 g. of 85 percent phosphoric acid. The slightly waxy precipitate of crude lauroguanamine which resulted was removed by filtration, washed with water, and air dried.

Half of the slightly damp solid was dissolved in approximately a liter of boiling methyl ethyl ketone. Celite and charcoal were added, the mixture filtered, and the yellow filtrate thus obtained was placed in a refrigerator. Colorless plates separated which were removed by filtration and washed with a small amount of cold methyl ethyl ketone. The remaining half of crude solid was dissolved in the light yellow filtrate, treated with decolorizing charcoal and the product recovered by recrystallization.

As air-drying was continued, the plates lost their methyl ethyl ketone of crystallization and turned into a colorless powder. The first crop weighed 208 g. and the second 292 g. Both crops began softening around 70° C. and gave slightly turbid melts by 100° C. The semi-purified yield of lauroguanamine product was 500 g. of 94 percent of the theoretical quantity.

*Example III.—Lauroguanamine*

A second preparation was carried out, in the same manner as described in Example II. In this experiment 500 ml. of dimethyl sulfoxide, 168 g. (2.0 moles) of dicyandiamide and 20 g. of 85 percent potassium hydroxide were employed in the initial charge. In the second charge no additional catalyst was added while the amount of dicyandiamide introduced was 84 g. (1 mole).

The once recrystallized yield of the lauroguanamine product was 422 g. or 79.5 percent. Melting occurred as described in Example II. A second recrystallization of the combined crops of Example II and III carried out in the presence of decolorizing charcoal and with reuse of the methyl ethyl ketone gave an 832 g. recovery from a total of 922 g. The melting point of the lauroguanamine product was 115–117° C. (Literature value: 115–116° C.; s-Triazines and Derivatives, Smolin and Rapoport, Interscience Publishers, Inc., New York, N.Y. (1959), p. 244.)

*Example IV.—2-ethylhexanoguanamine*

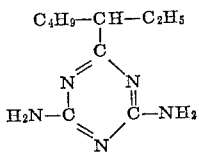

A stirred mixture of 84 g. (1.0 mole) of dicyandiamide, 500 ml. of dimethyl sulfoxide, 6.6 g. of 85 percent potassium hydroxide, and 250 g. (2.0 moles of 2-ethylhexanonitrile was heated under a refluxing condition for one hour at 140° C. A second charge of 84 g. (1.0 mole) of dicyandiamide and 6.6 g. of 85 percent potassium hydroxide was then added and the mixture heated for an additional period of one hour at 140° C.

After standing overnight, a third charge of 6.6 g. of 85 percent potassium hydroxide and 84 g. (1.0 mole) of dicyandiamide was added and the mixture heated at 140° C. for an hour. Finally, a fourth charge of 84 g. (1.0 mole) of dicyandiamide and 6.6 g. of 85 percent potassium hydroxide was added and the stirred mixture heated at 140° C. for five hours. Melamine which had formed as a by-product during the reaction was filtered from the hot mixture and the filtrate poured onto 885 g. of ice. The solid which precipitated was filtered, washed well with water, and dried in a vacuum oven at 70° C. under water pump vacuum. The yield of crude 2-ethylhexanoguanamine was 375 g. or 90 percent of the theoretical quantity. Melting occurred at 108–111° C. Recrystallization of the crude product from hot methyl ethyl ketone gave 324 g. of fine, colorless crystals (77 percent of the theoretical yield). The melting point of the purified product was found to be 114–115° C. (Literature value: 108–109.5° C.; s-Triazines and Derivatives, Smolin and Rapoport, Interscience Publishers, Inc., New York, N.Y. (1959), p. 244.)

*Example V.—Acetoguanamine*

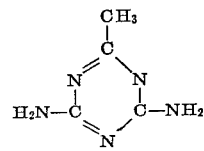

A 5 liter, three-necked, round bottom flask, equipped with a mechanical stirrer, thermometer, and reflux condenser was charged with 1344 g. (16.0 moles) of dicyandiamide, 615 g. (15.0 moles) of acetonitrile, 33 g. (0.5 mole) of 85 percent potassium hydroxide, and 1250 ml. of dimethyl sulfoxide.

A clear, nearly colorless solution was present in the reaction flask at the initial reflux temperature of 99° C. After 0.5 hour, a colorless product began to separate from solution and during this time some ammonia was evolved. After 1.25 hours, the temperature of reaction mixture was 110° C. and after 1.5 hours the temperature of the reaction mixture was 115° C. and there was limited reflux action. At the end of 2.25 hours, the temperature of the reaction mixture had risen to 130° C. Then the thick slurry was diluted with xylene and allowed to cool overnight.

The colorless product was broken up, filtered, washed with acetone and air dried. The crude acetoguanamine product thus prepared melted at 255–260° C. and weighed 2414 g. The above theory weight indicated that residual dimethyl sulfoxide was present in the crude product.

In the next step the crude acetoguanamine product was recrystallized in three portions, in the presence of decolorizing charcoal, from water. The filtrate was reused. The colorless, hydrated crystals of acetoguanamine were dried in an oven at 110° C. yielding a colorless powder. The recrystallized product was 1594 g. or 85.5 percent of the theoretical quantity. Melting occurred at 274–275° C. (Literature value: 271–3° C.; s-Triazines and Derivatives, Smolin and Rapoport, Interscience Publishers, Inc., New York, N.Y. (1959), p. 244.)

*Example VI.—Stearoguanamine*

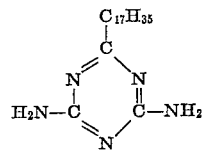

A stirred mixutre of 3 moles of dicyandiamide (252 g.), 3.0 moles of stearonitrile (795 g.), and 25 g. of 85 percent potassium hydroxide in 1000 ml. of dimethyl sulfoxide was heated to a temperature of 100° C./20–30 mm. Hg to remove any water present in the mixture. When bubbling had ceased, normal pressure was restored and the temperature increased to 130° C. at which temperature heating continued for 3 hours.

An additional 2.0 moles of dicyandiamide (16.8 g.) and 10 g. of 85 percent potassium hydroxide were added to the yellow mixture at room temperature and the materials again heated to 100° C./20–30 mm. Hg to remove water. After two hours, all of the water had been removed but the evolution of ammonia continued. Normal pressure was again restored and the mixture heated at 130° for 5 hours.

The tan mixture thus obtained was filtered through a steamjacketed, Buchner funnel to remove the melamine by-product. In the next step the resulting orange filtrate was added to cold water to precipitate the stearoguanamine product and to remove the dimethyl sulfoxide. This mixture was filtered in a basket-type centrifuge. The solid, yellow product which was recovered was placed in a heated vacuum desiccator and held at 35° C./20–30 mm. Hg for 20 hours. The weight of the crude product was 965 g. or 92 percent of the theoretical quantity. After one recrystallization from isopropyl alcohol, the semi-crude stearoguanamine product melted at 105° C. (Literature value: 112–117° C.; 116–117° C.; 115–118° C.; s-Triazines and Derivatives, Smolin and Rapoport, Interscience Publishers, Inc., New York, N.Y. (1959), p. 245.)

*Example VII.—Preparation of trichloroacetoguanamine*

A 3 necked, 1 liter, round bottomed flask equipped with a stirrer, thermometer, reflux condenser, and addition funnel was charged with 152.0 grams (1.8 moles) of cyanoguanidine, 6.6 grams (0.10 mole) of 85 percent potassium hydroxide, and 200 ml. of dimethyl sulfoxide. The mixture was stirred at 70° C. until all of the caustic pellets dissolved. Trichloroacetonitrile (175 grams; 1.2 moles) was slowly added and the temperature rose to 80° C. The heating mantle was removed and the temperature maintained at 80 to 84° C. by the rate of addition. The solution became light yellow as the reaction proceeded. Addition required one hour. During the latter part of the addition forced cold air from a blower helped cool the flask. Near the end, addition was speeded up and the temperature allowed to climb to a maximum of 94° C. Reaction was exothermic to the end of the addition. The viscous, yellow slightly turbid solution was allowed to cool and the mixture solidified. The temperature was raised to 100° C., giving a yellow melt. The liquid was poured into ice water which contained acetic acid to neutralize the catalyst. The precipitate was filtered, washed with ice water, and air dried. The nearly colorless solid weighed 272 grams, representing a 99.5 percent crude yield. Melting, with decomposition, occurred at 242 to 243° C. (according to the literature "s-Triazines and Derivatives," Smolin and Rapoport, Interscience Publishers, New York, N.Y. (1959), p. 245, the decomposition point is 235–236° C.).

*Example VIII.—Oxypropylation of melamine*

After addition of 850 ml. (915 grams) of dimethyl sulfoxide to a mixture of 504 grams (4.0 moles) of melamine and 15 grams of 85 percent potassium hydroxide in a 5 liter, 3-necked flask, the mixture was stoppered and shaken. The slurry became warm and set to a mush. The flask was then tared. Propylene oxide was reacted at 100° C. under nitrogen and atmospheric pressure, while the mixture was stirred with a magnetic stirrer. A Thermocap relay was used to control the temperature, and a water cooled condenser topped with a Dry Ice-acetone condenser was used to minimize loss of propylene oxide. Reaction was initially exothermic. As propoxylation continued all of the melamine dissolved. After addition of all of the propylene oxide, the temperature was maintained ½ hour at 100° C. after all reflux of propylene oxide ceased. When cool, the flask was reweighed to determine the exact quantity of propylene oxide reacted, which was 1800 grams.

The tan syrup was neutralized with 112 grams of 85 percent phosphoric acid. This amount represented 84 grams or .85 mole of 100 percent phosphoric acid in excess of that required to neutralize the potassium hydroxide catalyst.

Attapulgus clay (90 grams) was added to the viscous syrup which contained a white suspension of salt. The mixture was stripped at water pump vacuum for 30 minutes at 100° C. and filtered hot. The filtrate was then stripped to remove all solvent, first at 100° C. at water pump vacuum and finally at 150° C./1–2 mm. To remove turbidity, a final filtration at 150° C. through a Celite covered paper on a Buchner funnel was made. Just prior to filtration, 3 grams of 2,6-ditertiary butyl-p-cresol (antioxidant) was added to the syrup.

The filtrate was given a final stripping at 150° C./1–2 mm. for 2 hours. Analysis gave the following values:

| | |
|---|---|
| Hydroxyl No. | 359:357 |
| Acid No. | 14.4 |
| Percent water | 0.08 |
| Apparent pH: | |
| 10:1 MeOH-H$_2$O | 8.0 |
| 10:6 Isop-H$_2$O | 7.8 |
| Viscosity 100° F., cs. | 107,793 |
| P.p.m. Na | 13 |
| P.p.m. K | 13 |

Based on the weight of propylene oxide and phosphoric acid added, the functionality was 3.84.

For purposes of comparison, to show the effect of carrying out the reaction without a solvent, melamine, 6.3 grams (0.5 mole) and propylene oxide, 11.6 grams (0.20 mole) were sealed in a 150 ml. pressure cylinder and heated at 100° C. for 8 hours. At the end of this time the cylinder was cooled, opened and the contents removed. After evaporating the propylene oxide, 6.2 grams of unreacted melamine remained.

For purposes of further comparison, to show the effect of carrying out the reaction in a solvent other than a lower dialkyl sulfoxide a mixture of 126 grams (1.0 mole) of melamine, 6.3 grams of 85 percent KOH, and 300 ml. of dimethylformamide was stirred and heated to 100° C. On heating, the mixture swelled and the solvent was absorbed by the melamine. Propylene oxide was gradually added at 100° C., but after a very short time the temperature fell even though heating was continued for three hours. The oxide was allowed to escape so that the temperature could be raised to 125° C. More propylene oxide was added, but again the temperature fell. Heating was continued for another three hours. Substantially all of the mealmine was recovered unreacted.

*Example IX.—Oxypropylation of melamine*

The same apparatus used in Example VIII to prepare melamine was employed.

A mixture of 63 grams (0.50 mole) of melamine, 3.15 grams of 85 percent potassium hydroxide, and 110 grams (100 ml.) of dimethyl sulfoxide was stirred and heated at 100° C. while 624 grams of propylene oxide was reacted under N$_2$. The solvent was then stripped from the light yellow liquid at 110° C./1–2 mm. until the weight loss was 110 grams.

An additional 20 grams of 85 percent potassium hydroxide and 3 grams of 2,6-ditertiary butyl-p-cresol (antioxidant) was added to the viscous syrup and propoxylation continued at 125–135° C. until an additional 3425 grams of propylene oxide was reacted. The total weight of reacted propylene oxide was 4049 grams.

The catalyst was neutralized by addition of a slight excess (19 grams) of concentrated sulfuric acid, diluted to 50 percent. Addition of 150 grams of Attapulgus clay and 5 grams of decolorizing charcoal was made and the stirred mixture heated first at 100° C./1–2 mm. and then at 125° C./1–2 mm. to remove water and volatiles. After filtration of the hot syrup, a final stripping was carried out at 125° C./1–2 mm. Analysis gave the following values:

| | |
|---|---|
| Hydroxyl No. | 56.1:56.2 |
| Acid No. | 0.12 |
| Unsaturation meq./g. | 0.33 |
| P.p.m. H$_2$O$_2$ | 100 |
| Apparent pH: | |
| 10.0 MeOH-H$_2$O | 10.0 |
| 10.6 Isop-H$_2$O | 9.6 |
| Viscosity 110° F., cs. | 355 |
| P.p.m. Na | 2.2 |
| P.p.m. K | <1 |

*Example X.—Oxypropylation of N, N-diallylmelamine*

N,N-diallylmelamine was oxypropylated in a manner after Example I utilizing 5.0 moles of N,N-diallylmelamine (1030 grams), 1814 grams of propylene oxide reacted and 750 ml. of dimethyl sulfoxide. The reaction product had the following characteristics:

| | |
|---|---|
| Hydroxyl No. | 282:284 |
| Acid No. | 0.58 |
| Unsaturation Meq./g. | 0.027 |
| P.p.m. H$_2$O$_2$ | 31 |
| Apparent pH: | |
| 10:1 MeOH-H$_2$O | 8.8 |
| 10:6 MeOH-H$_2$O | 8.7 |
| Viscosity 100° F., cs. | 4,963 |
| P.p.m. Na | 8:7 |
| P.p.m. K | 17:19 |

*Example XI.—Oxypropylation of mono-n-butylmelamine*

Mono-n-butylmelamine was oxypropylated in a manner after Example I utilizing 1.87 moles of mono-n-butylmelamine (340 grams), 960 grams of propylene oxide reacted and 350 ml. of dimethyl sulfoxide. The reaction product had the following characteristics:

| | |
|---|---|
| Hydroxyl No. | 322:321 |
| Acid No. (Alk. No.) | 4.53 |
| Apparent pH: | |
| 10:1 MeOH-H$_2$O | 11.8 |
| 10:6 Isop-H$_2$O | 11.5 |
| Viscosity 100° F., cs. | 2844 |
| P.p.m. Na | 7.6 |
| P.p.m. K | 71:71 |

*Example XII.—Preparation and oxypropylation of n-butyroguanamine*

A stirred mixture of 269 grams (3.2 moles) of cyanoguanidine, 207 grams (3.0 moles) of n-butyronitrile, 15 grams of 85 percent potassium hydroxide, and 600 ml. of dimethyl sulfoxide was heated to 100° C. under a reflux condenser. The system was kept under nitrogen. Before 100° C. was reached, complete solution occurred. A mild exothermic reaction occurred initially and the temperature rose to 110° C. After the temperature fell to 100° C., heating was continued. The total heating period was 3½ hours. The solution was allowed to stand overnight while nitrogen slowly passed through the system.

In the morning, the flask contained an almost solid mass of n-butyroguanamine. The mixture was heated to 110° C. to give a slightly turbid solution. After cooling to 100° C. oxypropylation was somewhat exothermic. A total of 1008 grams of propylene oxide was reacted. The catalyst was neutralized and the pH lowered by addition of 52.5 grams of 85 percent phosphoric acid. This amount of acid represented an excess of 33.2 grams of 100 percent acid over that necessary to form dipotassium hydrogen phosphate. After addition of 100 grams of Attapulgus clay, the mixture was stripped under vacuum. The hot mixture was filtered by suction through filter paper coated with Celite. Analysis of the syrup gave the following values:

| | |
|---|---|
| Hydroxyl No. | 368 |
| Alkaline No. | 0.79 |
| Percent water | 0.12, 0.13 |
| Apparent pH: 10:6 Isop-H$_2$O | 8.6 |
| Viscosity 100° F., cs. | 70,265 |

*Example XIII.—Oxypropylation of benzoguanamide*

A stirred mixture of 748 grams (4.0 moles) of benzoguanamine, 15 grams of 85 percent potassium hydroxide, 548 grams (500 ml.) of dimethyl sulfoxide, and 3 grams of 2,6-ditertiarybutyl-p-cresol (antioxidant) was heated under nitrogen to 100° C. A thin slurry formed. Propylene oxide was added and after 400 grams had reacted a light tan solution formed. Oxypropylation was exothermic and only occasional heating was required to maintain the temperature at 100 to 110° C. A total of 1852 grams of propylene oxide was reacted. The solution was then stripped, first at 100° C. under water pump vacuum, and finally at 125° C./1–2 mm. The weight loss was 546 grams. A total of 41.5 grams of 85 percent phosphoric acid (theory for neutralization of catalyst=13.2 grams) was then added to lower the pH. After addition of 100 grams of Attapulgus clay, a final stripping at 125° C./1–2 mm. was carried out for three hours. Filtration, by suction through a Celite coated paper in conjunction with a steam heated funnel, was rapid. Analysis gave the following values:

| | |
|---|---|
| Hydroxyl No. | 302:302 |
| Acid No. | 1.19 |
| Percent water | 0.11 |
| Apparent pH: | |
| 10:1 MeOH-H$_2$O | 8.3 |
| 10:6 Isop-H$_2$O | 8.1 |
| Viscosity 100° F., cs. | 81,250 |
| P.p.m. Na | 5.8, 6.4 |
| P.p.m. K | 0.8, 0.9 |

*Example XIV.—Flexible foam from oxypropylated melamine*

Oxypropylated melamine (100 g.) prepared in accordance with a procedure similar to that of Example IX having a hydroxyl number of 56, was admixed with 1 g. of silicone emulsifier, 0.2 g. of stannous octoate, 0.1 g. of triethylene diamine catalyst, 3.5 g. of water and 5 g. of trichloromonofluoroethane. The resulting mixture was admixed with 44.5 g. of commercial grade toluene diisocyanate (approximately 80 percent 2,4- and 20 percent 2,6-toluene diisocyanate) at a temperature of approximately 23° C. A cream time of 15 sec. was obtained and rise time of 75 sec. was obtained. The resulting foam was flexible and had a good appearance from the standpoint of uniformity of cell structure and color.

*Example XV.—Rigid foam from oxypropylated mono-n-butylmelamine*

Oxypropylated mono-n-butylmelamine (100 g.) having a hydroxyl number 321 was admixed with 1.5 g. of silicone oil emulsifier, and 25 g. of trichloromonofluoroethane diamine, and the resulting mixture was further admixed with 55 g. of the commercial toluene diisocyanate of Example XIV. The reaction was carried out at room temperature and was extremely reactive even without a catalyst. The cream time was 3 sec., the rise time was 5 sec., and the tack time was 5 sec. The resulting foam was friable and rigid.

*Example XVI.—Rigid foam from oxypropylated butyroguanamine*

Oxypropylated n-butyroguanamine (100 g.) having a hydroxyl number of 393 was admixed with 0.2 g. of stannous octoate, 1.3 g. of silicone oil and 25 g. 1,1,2-trichloro-1,2,2-trifluoroethane. The resulting mixture was admixed with 66 g. of commercial toluene diisocyanate of Example XIV. The isocyanate was at room temperature and the mixture of other components was at a temperature of 110° F. A rigid foam formed after a cream time of 5 sec., a rise time of 10 sec., and a tack time of 18 sec. The resulting rigid foam had a good cell structure.

*Example XVII.—Rigid foam from oxypropylated benzoguanamine*

Oxypropylated benzoguanamine (100 g.) having a hydroxyl number of 302, was admixed with 1.5 g. of silicone oil, 0.3 g. of stannous octoate, and 40 g. of 1,1,2-trichloro-1,2,2-trifluoroethane. The resulting mixture was heated to 105° F. and then admixed with 50 g. of commercial toluene diisocyanate of Example XIV, having a temperature of about 23° C. The cream time was 25 sec. and rise time was 75 sec. and the tack time was 60 sec. The resulting foam was rigid and had a good appearance.

*Example XVIII.—Rigid foam from oxpyropylated acetoguanamine*

Oxypropylated acetoguanamine (100 g.) having a hydroxyl number of 348 was admixed with 1.5 g. of silicone oil, 25 g. of 1,1,2-trichloro-1,2,2-trifluoroethane, and 0.2 g. of stannous octoate. The resulting mixture, at a temperature of 100° F., was admixed with 60 g. of commercial toluene diisocyanate of Example XIV heated to a temperature of 75° F. A rigid foam was formed after a cream time of 15 sec., a rise time of 20 sec., and a tack time of 20 sec. The resulting rigid foam had a large cell structure and was quite hard.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

I claim:

1. In the process for the preparation of 4,6-diamino-1,3,5-triazine by reacting cyanoguanadine with an organic nitrile in the presence of a basic catalyst, the improvement which comprises effecting said reaction in the presence of a lower dialkyl sulfoxide solvent.

2. The process of claim 1 wherein said organic nitrile has the formula $R^1CN$, where $R^1$ is selected from the group consisting of alkyl having from 1 to about 23 carbon atoms, aryl having between about 6 and about 10 carbon atoms, alkylene having between about 6 and about 20 carbon atoms, and heterocyclic having between about 4 and about 8 carbon atoms, and said lower dialkyl sulfoxide is dimethyl sulfoxide.

3. The process of claim 1 wherein said lower dialkyl sulfoxide is dimethyl sulfoxide and said organic nitrile is lauronitrile.

4. The process of claim 1 wherein said lower dialkyl sulfoxide is dimethyl sulfoxide and said organic nitrile is acetonitrile.

5. The process of claim 1 wherein said lower dialkyl sulfoxide is dimethyl sulfoxide and said organic nitrile is n-butyronitrile.

6. The process of claim 2 wherein the resulting reaction product containing 4,6-diamino-1,3,5-triazine and the basic catalyst is admixed with an alkylene oxide in a molar ratio of said triazine to said alkylene oxide of about 1:2 and about 1:125 to yield the corresponding oxyalkylated triazine.

7. The process of claim 6 wherein said alkylene oxide is propylene oxide.

8. In the process for the oxyalkylation of amino-1,3,5-triazine having at least 2 amino groups with an alkylene oxide in the presence of a basic catalyst, the improvement which comprises effecting said oxyalkylation in a lower dialkyl sulfoxide solvent.

9. The process of claim 8 wherein said alkylene oxide is an unsubstituted lower alkylene oxide.

10. The process of claim 8 wherein said lower dialkyl sulfoxide is dimethyl sulfoxide.

11. The process of claim 10 wherein said alkylene oxide is a lower alkylene oxide and said triazine is 2,4,6-triamino-1,3,5-triazine.

12. The process of claim 10 wherein said alkylene oxide is a lower alkylene oxide and said triazine is 4,6-diamino-1,3,5-triazine.

13. The process of claim 10 wherein said alkylene oxide is a lower alkylene oxide and said triazine is lauroguanamine.

No references cited.

WALTER A. MODANCE, *Primary Examiner.*

JOHN M. FORD, *Assistant Examiner.*